(12) United States Patent
Asplund (10) Patent No.: US 8,794,410 B2
(45) Date of Patent: Aug. 5, 2014

(54) SYSTEM ADAPTED FOR ONE OR MORE VEHICLES, WHICH MAY BE DRIVEN FORWARD ELECTRICALLY

(75) Inventor: Gunnar Asplund, Solna (SE)

(73) Assignee: Elways AB, Solna (SE)

( * ) Notice: Subject to any disclaimer, the term of this patent is extended or adjusted under 35 U.S.C. 154(b) by 169 days.

(21) Appl. No.: 13/322,305

(22) PCT Filed: Jun. 2, 2010

(86) PCT No.: PCT/SE2010/050602
§ 371 (c)(1),
(2), (4) Date: Nov. 23, 2011

(87) PCT Pub. No.: WO2010/140964
PCT Pub. Date: Dec. 9, 2010

(65) Prior Publication Data
US 2012/0067684 A1   Mar. 22, 2012

(30) Foreign Application Priority Data

Jun. 3, 2009 (SE) ........................... 0900759

(51) Int. Cl.
*B60M 1/30* (2006.01)
*B60M 1/34* (2006.01)
*B60L 9/16* (2006.01)
*B60L 5/40* (2006.01)
*B60L 11/12* (2006.01)
*B60M 3/04* (2006.01)
*B60L 11/18* (2006.01)
*H01R 41/02* (2006.01)

(52) U.S. Cl.
CPC ... *B60L 5/40* (2013.01); *B60L 9/16* (2013.01); *B60L 2200/26* (2013.01); *Y02T 10/7077* (2013.01); *Y02T 10/7005* (2013.01); *Y02T 10/648* (2013.01); *B60L 11/12* (2013.01); *B60M 3/04* (2013.01); *H01R 41/02* (2013.01); *B60M 1/34* (2013.01); *B60L 11/1801* (2013.01)
USPC ........................................ 191/22 C; 104/140

(58) Field of Classification Search
USPC .......... 191/2, 3, 14, 22 R–25, 22 C; 104/139, 104/140, 142, 146
See application file for complete search history.

(56) References Cited

U.S. PATENT DOCUMENTS 3,637,956 A   1/1972   Blackman
3,914,562 A   10/1975   Bolger
(Continued)

FOREIGN PATENT DOCUMENTS

FR   2 696 985   10/1992
WO   91/01232   2/1991
(Continued)

OTHER PUBLICATIONS

International Search Report for PCT/SE2010/050602.

*Primary Examiner* — R. J. McCarry, Jr.
(74) *Attorney, Agent, or Firm* — Morgan, Lewis & Bockius LLP (57) ABSTRACT

The present invention has its application to a system for driving an electric and by one or more batteries powered vehicle along a roadway, comprising "a" one or more vehicles, which may be driven by an individual electric motor or motors and where in the respective vehicles exhibit a power-controlling control circuit for creating the necessary power and/or speed control and wherein required power i.a. can be provided primarily by a chargeable can be provided primarily by a chargeable battery set associated with the vehicle and "b" a plurality of road sections road portions divisible for the roadway, each being allotted one or more vehicle external electric stations for charging the battery set thereby and/or for supplying necessary power and energy for driving the vehicle. The underneath side of the mentioned vehicle is provided with a contact means displaceably positioned up and down and sideways, counted in the direction of transportation. Said roadway and its road sections or portions exhibits an elongated track or groove, each road section is supporting two rails in the groove and disposed under the driving path of the road section or portion. The rails being supplied with current and voltage. Said contact means is coordinated with a control equipment for creating simple adaptation of the contact means for registering the contact means for mechanical and electrical contact against said two rails.

6 Claims, 5 Drawing Sheets

(56) References Cited

U.S. PATENT DOCUMENTS

| | | | |
|---|---|---|---|
| 4,007,817 A | | 2/1977 | Bolger |
| 4,129,203 A | * | 12/1978 | Berman .......................... 191/48 |
| 4,139,071 A | | 2/1979 | Tackett |
| 4,476,947 A | | 10/1984 | Rynbrandt |
| 5,464,082 A | | 11/1995 | Young |
| 5,960,717 A | * | 10/1999 | Andre .......................... 104/139 |
| 6,240,852 B1 | * | 6/2001 | Camp .......................... 104/140 |
| 2007/0278059 A1 | | 12/2007 | Afriat |

FOREIGN PATENT DOCUMENTS

| | | |
|---|---|---|
| WO | 93/10995 | 6/1993 |
| WO | 2007/056804 | 5/2007 |

\* cited by examiner

SYSTEM ADAPTED FOR ONE OR MORE VEHICLES, WHICH MAY BE DRIVEN FORWARD ELECTRICALLY

RELATED APPLICATIONS

The present application is a U.S. National Phase Application of International Application No. PCT/SE2010/050602 (filed 2 Jun. 2010) which claims priority to Swedish Application No. 0900759-2 (filed 3 Jun. 2009).

TECHNICAL FIELD OF THE INVENTION

This invention generally refers to a system, adapted for such vehicles which may be powered and driven forward electrically and more particularly to such a system in which i.a. one or more batteries and/or sets of batteries for power adaptation and storage of energy are intended to be capable of driving the vehicle forward rolling or moving along a roadway.

Systems of the relevant type are based on utilizing roadway sections or roadway portions, in which the upper surface of said roadway exhibits at least one track or groove and in which an electric conductor, which may be placed under electric power, are disposed, primarily being provided with exposed and uninsulated surface portions.

In accordance with the directions of the present invention such system should comprise "a" a plurality of roadway sections or roadway portions, subdividing the total length of the roadway, each road section or portion being allotted to at least one electrically conducting conductor, connectable over a switch to a stationary, vehicle external, electric station, serving as an external source of energy and oriented external to the vehicle and adjacent its road section or portions, for i.a. charging of the batteries and/or the set of batteries associated with vehicle but primarily for powering, propelling or running, the vehicle by means of said battery set along the roadway and its road sections or portions, and "b" one or more vehicles, which may be powered and driven each by means of its electric motor or a plurality of motors, wherein the respective vehicle is to exhibit a power-controlling or power-regulating control circuit, for creating a selected and required forward-propelling or driving effect and/or a speed adaptation and/or any additional control.

The invention is intended to be able to be applied at roadways in the form of general and individual roads, for heavy vehicles or lorries adaption, and along the road portions thereof, but it can also find its use in industrial plants having different requirements with regard to the need of power and the need of energy.

Concurrently with power charging of the battery set from any external source of energy the invention i.a. intends to supply the power and the energy which will be required for a chosen requirement of power for driving the vehicle upwards and along an upwardly slanting road portion.

More particularly the present invention indicates such a system in which a vehicle, not utilizing rails, such as a truck, when being propelled along chosen road portions with its battery set, associated with the vehicle, can be provided with supplementary power such as from the external source of power or alternatively from a vehicle-related source of power, such as a diesel generator.

In this regard the present invention proposes a "first" vehicle-related source of power, such as a diesel generator, a "second" vehicle-related source of power, such as a battery set, and a "third" source of power, separated from the vehicle and external thereto, such as at least one conductor, which may be placed under electric power built into a track in successively oriented road portions, wherein the conductor of a chosen road portion are electrically insulated from a corresponding conductor of an adjacent (preceding or following) road portion.

The present invention is based on having two or more conductors, included in tracks in their road portions, with such a track (not the conductors) extending continually from one road portion to another adjacent road portion.

The voltage, which is allotted to these conductors that may be subjected to electric power, can be an alternating voltage, an AC-voltage (with a rectifier units related to a vehicle) or a direct voltage, a DC-voltage.

In choosing a direct voltage one of the conductors may expose a positive potential whereas the other conductor may expose a negative potential and an additional conductor bay be allotted to ground potential or "0" potential, wherein the motor of the vehicle may be driven at twice the voltage value.

In choosing an alternating voltage the two conductors may expose counter-current phases symmetrically related to ground potential or "0" potential.

The driving of the vehicle via its motor may be of a direct current type or an alternating current type, whereby a DC/AC transformer is to be use.

BACKGROUND OF THE INVENTION

Methods, arrangements and structures related to the above-mentioned technical area or field and character are known earlier in a plurality of different embodiments.

Electrically driven vehicles may to advantage be categorized as "railbound vehicles" or "non-railbound vehicles".

"Railbound vehicles" are conveyed along their roadway and its road portions by parallel rails, which are positioned in the direction of the roadway, which are openly disposed by means of sleepers and which guide the fixed pair of wheels of the vehicle.

"Non-railbound vehicles" are conveyed along their roadway and its road portions by means of a steering or control equipment belonging to the vehicle.

The present invention is based on and is intended to be utilized in the latter category and technology and is primarily intended to be applicable on heavy trucks or lorries, with or without a trailer connected thereto, wherein from the U.S. Pat. No. 4,129,203-A it is known a vehicle-related arrangement for letting contact springs, positioned below and under the vehicle, move upwardly and downwardly and sideways, with the contact springs lying under the vehicle for a mechanical and electrical cooperation with non-insulated surface portions of the electric conductors (14) associated with each of the road portions.

Utilizing an insulator (16) inside a channel (18), which supports the conductors in the form of rails (14) is indicated here. A cover plate (20) provided with a slit (12) is removably attached to the upper and opposing wall portions of the channel (18), with said cover plate (20) being adjusted to a plane connecting to the upper surface (22) of the road portion.

FIGS. 2 and 3 in the mentioned patent publication describe a vehicle-related table (98), to which table an arm (10) is rotatably secured (94, 96, 99). Sensors (30), associated with the table (98), generate signals, which with regard to their phase positions and magnitudes indicate the direction of and the distance from an axis (99) of rotation to the slit (12) in the cover plate (20), which signals are based on changes in a generated magnetic field. The table (98) and the arm (10) may be driven by a motor (32) between limits determined beforehand and limit breakers (40, 41) placed there.

Patent publication WO 93/10995-A discloses an earlier known system for conveying electrically driven vehicles along a roadway and its road portions.

FIG. 9 of the above-mentioned patent publication clarifies the basic structure of the system.

It is indicated here that the roadway (14) and its road portions are provided with electrically conductive road sections (300a-30Of), wherein a road section can be considered to correspond to a road portion.

The vehicles (310) have an electric motor (320) and two (312, 314) or three (312, 312' and 314, respectively) contact springs placed thereunder and being adapted for mechanical and electrical contact with uninsulated electrically conductive conductors, the lengths of which are adapted to correspond to a chosen length (identically equal lengths) for utilized road sections.

The electrically conductive conductors in the road sections (300a-30Of) are disposed behind each other with an intermediately disposed free space (302a-302e) so as to thereby avoid a short circuit between sliding contact springs (312, 312', 314, respectively).

Every second road section (300b, 30Od, 30Of, respectively) in a line of road sections is connected continuoually to a reference voltage (ground potential), whereas the remaining or intermediate road sections (300a, 300c and 20Oe, respectively) can either be connected directly to a direct current voltage source (440) or be connected over a switching means (304a, 304b, 304c, respectively) to any appropriate electric source of energy (308), when a vehicle is in its vicinity.

When an embodiment is exposing that three contact springs are utilized, the distance between the latter is to be chosen such, that two or three contact springs always are in an electric contact with respective of two road sections exhibiting opposite polarities and so that neither of the two contacts is able to short circuit the free space (302a-302e) between two adjacent road sections.

This system here requires specially constructed vehicles (310) for its function, in which vehicles a chosen distance between forward contacts (314) and rearward contacts (312, 312') is to be identically equal and furthermore selected somewhat longer than the equal lengths of the road sections (300b, 30Od).

Thus, specially constructed vehicles, having front contacts and rear contacts, are required and in which the respective ones of the utilized road sections (300a-30Of) are to be chosen with mutually equal lengths and they are to be disposed after each other in the direction of travel of the vehicle, with equal mutual open and intermediate spaces (302a-302e).

The remainder of the patent publication indicates the presence of a single conductor or rail subjected to voltage within a road portion (page 5, lines 11-13) and that a vehicle is to request voltage to a road portion in front thereof (page 5, lines 19-21; page 6, lines 7-10; page 8, lines 28-32).

Furthermore it is indicated that rails (16), which may be subjected to voltage, are to be able to be provided with drain tracks (page 9, lines 1-4) positioned at the sides.

Lack of (or the presence of) an activating signal is to be able to actuate a control unit (38), (page 8, lines 23-27).

The necessary distance between contacts belonging to a vehicle is mentioned in page 10, lines 17-20, and a utilizing activity is initiated as radio signals, and is proposed on page 11, lines 2-4 and page 14, lines 1-16, respectively.

Furthermore, in page 15, lines 21-23 and in page 16, lines 1-15, the utilizing of a "Hall"-element (240) and the connection of the same to an amplifier (246), are proposed. Furthermore, alternatives of this element are illustrated in page 17, lines 3-9.

It is also known to propel or move a vehicle electrically along a roadway by means of an inductive transfer of energy, which is activated between a vehicle and a road portion lying therebelow.

As examples of this known technology reference is made to the contents of U.S. Pat. Nos. 3,914,562-A and 4,007,817-A, respectively.

The present invention concerns a concentrating to or an application to a roadway, exposing an upwardly open track or tracks adapted to each other to from one road portion and adjacent road portions, each with at least two, preferably three, parallel electric conductors introduced in each of, or selected, track portions, such as formed with uninsulated surface sections, and concerns an arrangement for ensuring a tracking or a testing of an adjacent road portion before that road portion becomes the object of applying voltage to the parallel electric conductors belonging to this adjacent and succeeding road portion (such as a road portion in front thereof).

STATEMENT OF THE PRESENT INVENTION

Technical Problem

If the circumstance is considered that the technical considerations that a person skilled in the relevant art has to evaluate in order to offer a solution to one or more given technical problems, mentioned hereunder, are on the one hand initially a necessary in-sight in the measures and/or the sequence of measures which are to be carried out and on the other hand a necessary choice of a single means or a plurality of means which are required, on the basis of this, the following technical problems must be considered to be relevant in producing and developing the present object of invention.

Considering the earlier standpoint of technology, as it has been described above, it should therefore be seen as a technical problem to be able to understand the significance of, the advantages related to, and/or the technical measures and considerations which will be required for in a system, adapted to an electrically, and by i.a. one or more batteries or a battery set, conveyable a propellable vehicle along a roadway and its road portions and a coupling arrangement adapted hereto, which is to comprise "a" a plurality of road sections or portions subdividing the roadway, each one being allotted to one or more electrically conductive conductors which may be connected, over a switch, to one or more stationary electric stations serving as a vehicle external source of energy (called a third source of energy in the following) for thereby i.a. charging the battery set belonging to the vehicle, which primarily are to be able to propel the vehicle along the road portions, and "b" one or more vehicles each propelable by an individual electric motor or motors and wherein the respective vehicles exhibit a power-controlling or regulating control circuit for creating the necessary power and/or a speed control, indicating the possibility of utilizing equal or different lengths of parallel electric conductors or rails for having voltage applied thereto, related to mutually electrically insulated road portions so as to offer a possibility of choosing the lengths of the conductors and their road portions in response to given requirements of a "continuous" supply of energy to the vehicle and its battery set and wherein the length of the respective road portion to advantage can be chosen considerably greater than that of the total length of the vehicle, so that no adaptation of the lengths of the road portions to a standard length for the vehicles will be required as in the known technology.

There is a technical problem in a vehicle, which on its underneath side is provided with a contact means displaceable up and down and sidewise, counting crosswise of the direction of conveyance of the vehicle, and wherein an elongated track or slit, via road portion after road portion carry, below the road surface formed by the road portions, conductors which can be supplied with current and voltage, such as rails, and wherein said contact means are coordinated with a vehicle-related control equipment for causing adaptation of the contact means so as at least to offer a mechanical and electrical contact against said conductors, to be able to understand the significance of, the advantages related to and/or the technical measures and considerations which will be required for creating coordination between the at least two conductors which may be provided with voltage and belong to the road portion and contact means of the vehicle over coordinated sliding contacts or rolling contacts, such as contact springs, for electric cooperation with the respective ones of the conductors or rails which may be subjected to voltage and that a road portion supporting the vehicle, over its conductors and its external electric source of energy, charges the battery set from a coupling means or a switch associated therewith, whereas a succeeding road portion, with its at least two electric conductors, is successively to be controlled with regard to an intact road portion criteria and when found intact thereafter be provided with its AC or DC supply voltage from its external electric energy source and over its associated connecting means or switch and activate said supply voltage solely during the time periods when the vehicle passes such a succeeding road portion.

There is a technical problem in being able to understand the significance of, the advantages related to, and/or the technical measures and considerations which will be required for letting a coupling means or a switch be related to each one of or to solely selected road portions and its electric conductors, wherein such a switch is to be related to a succeeding road portion with its conductors still not placed under voltage and wherein said coupling means is to be adapted, over a supervising or testing circuit, to initiate a clearance signal after sensing a criteria of an electrically intact road portion before the coupling means or switch is activated for furnishing or connecting a supply voltage to its conductors.

There is a technical problem in being able to understand the significance of, the advantages related to, and/or the technical measures and considerations which will be required for letting such supervising circuit be adapted to be initiated by a remote-controlled signal (radio signal) from the vehicle in order on the one hand to check that the road portion lying ahead with its conductors is exposing intact conditions and on the other hand to register an identity criteria allotted to the vehicle and also to activate the coupling means or switch in order to furnish a supply voltage to its conductors.

There is a technical problem in being able to understand the significance of, the advantages related to, and/or the technical measures and considerations which will be required for letting each of two single contact means, having at least two subsequent contact springs for one and the same conductor, be associated with the front portion of the vehicle.

There is a technical problem in being able to understand the significance of, the advantages related to, and/or the technical measures and considerations which will be required for letting one or more electric stations associated with only one road portion, or for one or more road portions, be activated solely in such time sections or slots when a switching means or switch associated with the station, over a sensor, senses the presence of a vehicle belonging to the system.

There is a technical problem in being able to understand the significance of, the advantages related to, and/or the technical measures and considerations which will be required for adapting a DC or an AC supply voltage to said conductors which may be furnished with current and furnished with voltage and/or a DC supply voltage from the vehicle-related first energy source to the transfer of power which is required for power supply, over the battery set, of the electrically driven motor having or exposing an instantaneous high load.

There is a technical problem in being able to understand the significance of, the advantages related to, and/or the technical measures and considerations which will be required for adapting said tracks and a cavity allotted to the tracks for supporting an electrically conductive cable, adapted for emitting and radiating heat and having an adapted resistance.

There is a technical problem in being able to understand the significance of, the advantages related to, and/or the technical measures and considerations which will be required for letting said contact means, associated with vehicle, be allotted the form of rolling contact causing means, allotted the form of one or more current removing or pick-up wheels or one or more current removing or pick-up sliding contacts, such as brush units.

There is a technical problem in being able to understand the significance of, the advantages related to, and/or the technical measures and considerations which will be required for an adaption to said vehicles, and to closely located contact means associated with said vehicle, a cleaning and/or cleansing means for an allotted track and its cavity.

There is a technical problem in being able to understand the significance of, the advantages related to, and/or the technical measures and considerations which will be required for indicating a system and a connecting arrangement wherein the battery set of the vehicle can retain its charge of power for a longer duration of time than what now is to be offered in consequence of a supplementary charging of the battery set during the journey and driving of the vehicle along selected road portions and during charging initiated primarily by the external source of energy but also when urgently needed from the first source of power (diesel generator) related to the vehicle itself.

There is a technical problem in being able to understand the significance of, the advantages related to, and/or the technical measures and considerations which will be required for letting said supplementary charging be adapted, over the external electric source of power, to charge the vehicle-carried batteries or battery set, whereas during this active supplying of power, which is dependent of the instantaneous need of power of the vehicle, with an increasing instanteous load, such as in shorter or longer slopes of the road, inclination of the slopes of the road and/or the speed and weight of the vehicle, occurs also from the battery set.

There is a technical problem in being able to understand the significance of, the advantages related to, and/or the technical measures and considerations which will be required for letting said contact means be coordinated with its control equipment, related to the vehicle, for creating over this control equipment a simple adaptation of the contact means for a "registration" (a contact-forming coordination) of the contact means with or in relation to said conductors or the like.

There is a technical problem in being able to understand the significance of, the advantages related to, and/or the technical measures and considerations which will be required for letting a coordination between the rails, put under power and associated with the road portion, and the contact means of the vehicle occur between two or more contact springs in an electric cooperation with the respective ones of the rails put under power, such as their uninsulated surface portion, and that road portion after road portion, with their electric conductors, successively are to be supplied with their DC or AC supply voltage from their external electric power source, solely during the time periods or slots when a vehicle passes this road portion.

There is a technical problem in being able to understand the significance of, the advantages related to, and/or the technical measures and considerations which will be required for indicating a system in which the road portions with their electric conductors can be chosen to be of an arbitrary standardized length and/or to be of mutually different lengths, so as to directly connect to or be adapted to a surrounding terrain, an expected power and/or power transfer and other relevant criteria.

There is a technical problem in being able to understand the significance of, the advantages related to, and/or the technical measures and considerations which will be required for letting selected road portions exhibit one or more narrow and elongated tracks or slits adapted with such narrow width as makes it possible to be able to cover and enclose said current suppliable and voltage suppliable conductors with or without covers.

There is a technical problem in being able to understand the significance of, the advantages related to, and/or the technical measures and considerations which will be required for letting said conductors be distributed or oriented within one cavity formed as a track or slit and distributed on opposite side surfaces of the cavity and/or its bottom surface.

The Solution

As its starting point the present invention takes the known technology indicated by way of introduction and builds on a system and/or a connecting arrangement for driving, an electrically and of one or a plurality of batteries and/or a battery set and/or other sources of energy, forwardly drivable vehicle along a roadway and its road portions comprising the combination of necessary characteristics disclosed in the preambles of claim 1 and claim 12, respectively.

In order to be able to solve one or more of the above-mentioned technical problems the present invention more specifically indicates that such a known technology is to be supplemented with the characteristics, which are disclosed in the characterizing portions of claim 1 and claim 12, respectively.

In addition the characteristics disclosed in the sub-claims are indicated as proposed embodiments falling within the framework of the basic concept of the present invention.

Advantages

The advantages that primarily must be considered as being characteristic of the present invention and the thereby indicated specific significant characteristics are that hereby prerequisites have been created or caused for in an adapted system, driving a forwardly drivable vehicle forward electrically and by one or more batteries in the form of a battery set along a roadway and its road portions, and a coupling arrangement according to the preambles of claims 1 and 12, respectively, indicating that the vehicle is to be capable of being driven by and/or offers a supplementing charging of the vehicle-related battery set from primarily an electric source of energy oriented external of the vehicle and related to a single road portion.

The invention offers an arrangement by which it will possible of testing or checking the conductors in a succeeding road portion, which may be subjected to tension or a power supply for a forwardly located road portion, before any voltage is connected to this road portion and its conductors.

The primary characteristics of a system, in accordance with the present invention, are disclosed in the characterizing portion of the following claim 1, whereas a connecting arrangement, in according to the present invention, is disclosed in the characterizing portion of the following claim 12.

SHORT DESCRIPTION OF THE DRAWINGS

Presently proposed embodiments, exhibiting the significant characteristics related to the present invention, will now be disclosed more specifically with the purpose of exemplification with reference to the accompanying drawings, wherein:

FIG. 5 shows a cross-section of different kinds of canalizations, wherein under "A" is shown a first embodiment of two tension-carrying conductors, in the form of rails and oriented to opposing side surfaces for a right-angular cavity, alternatively to a bottom surface of the cavity, and an upper conductor connected to ground potential, under "B" a second embodiment of two tension-carrying conductors having upper sealing covers, under "C" a third embodiment with a central track or slit for performing a cleaning and/or cleansing process over a means adapted to this, under "D1" and "D2" a fourth embodiment with current collectors that may be introduced and may be angled to a right angle, under "E1" and "E2" a fifth embodiment with current collectors in the form of circular arcs in two different positions, each rotatable about a center axis, under "F" a sixth embodiment with two spring-loaded covers for the tracks or slits with contact rails, under "G1" and "G2", respectively, a seventh embodiment in two projections with wheel-shaped current collectors, and an eighth embodiment with parallel wheel-shaped current collectors is shown in two projections under "H1" and "H2".

FIG. 10 illustrates a "Triac"-switch which is appropriate for the invention, whereas

DESCRIPTION OF THE EMBODIMENTS NOW PROPOSED

By way of introduction it should be pointed out that in the following description of a presently proposed embodiment, which exhibits the significant characteristics related to the invention and which is clarified by the Figures shown in the following drawings we have selected terms and specific terminology with the purpose of thereby primarily clarifying the basic concept of the invention.

However, in this connection it should be noted that the terms selected here shall not be seen as limiting solely to the terms utilized and selected here and it should be understood that each term selected in this manner is to be construed or interpreted such, that it in addition covers all technical equivalents which function in the same or substantially the same manner so as to thereby be capable of attaining the same or essentially the same purpose and/or technical result.

Thus, with reference to the accompanying drawings the basic prerequisites for the present invention and in which the significant characteristics related to the invention have been concretized are shown schematically and in detail by the now proposed and in the following more specifically described embodiments.

Figure 1A:
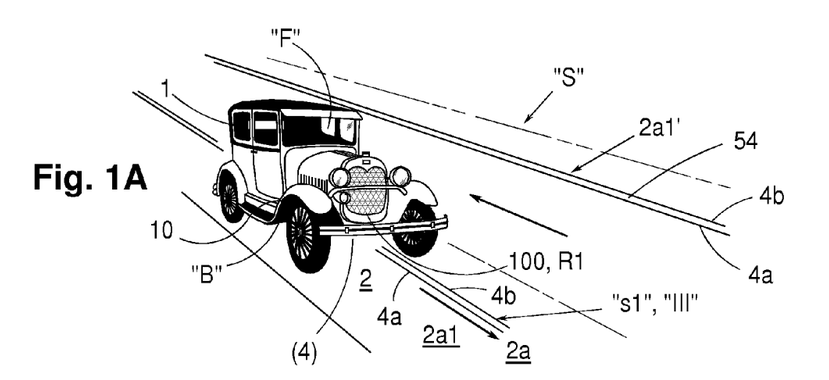
FIG. 1A shows a perspective view of a vehicle connected to or adapted as a Ford Model A converted to battery operation and having an electrically driven motor, a power-controlling control circuit for speed control and being adapted to an instantaneously acting load and necessary power as well as a steering arrangement or a steering controlling equipment.

Thus, FIG. 1A shows a system "S" adapted for driving an electric and by one or more batteries or a set of batteries conveyable vehicle 1 along a roadway 2 and its road sections or portions 2$a$1 and 2$a$1'.

Here the vehicle 1 comprises a "Ford Model A" exteriorly, but here it is converted to a battery-powered vehicle, having access to an external source of energy designated "s1"; "III".

The vehicle 1 of the invention is then to comprise not shown control equipment 3 so that a driver "F" (not shown) can drive and steer the vehicle 1 along the mentioned roadway 2 and its road portion 2$a$1.

Vehicle 1 could then also comprise a gearbox and other parts and components, which are required for driving the vehicle, but as these parts are well known to a person skilled in the art they will not be described in detail.

However, an electrically driven vehicle 1 does not need a gearbox as speed control as any output of power can be achieved by means of known electric and electronic circuits connected to its electric motor 5.

Figure 1B:
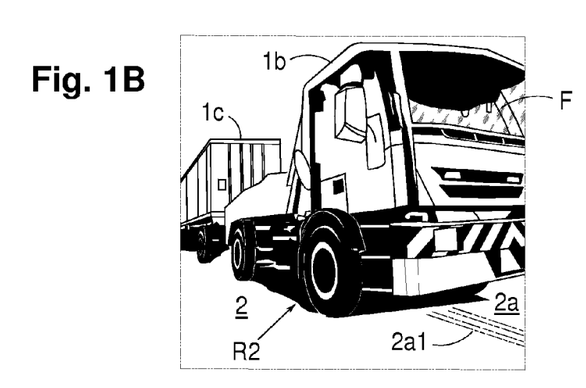
FIG. 1B shows a perspective view of a truck with a trailer and with a power-controlling control circuit, according to the principles of FIG. 1A, FIG. 1C clearly shows that two vehicle-related sources of energy, a first one ("I"), as a diesel generator, and a second one ("II"), as a battery or a battery set, and a third one ("III"), as a source of energy external to the vehicle and in the form of parallel rails, in the form of continuous tracks in a road portion to coordinated to a vehicle-related control circuit, which in response to electric power supplied to an electric motor chooses all of or a combination of the available power-supplied energy sources, with the power control, here being illustrated as a throttle, the motion of which is coupled to the control circuit.

In the same manner as FIG. 1A, FIG. 1B shows an electrically conveyable truck 1$b$, with a connected trailer 1$c$, along the roadway 2, 2$a$ and its road portion 2$a$1.

Figure 1C:
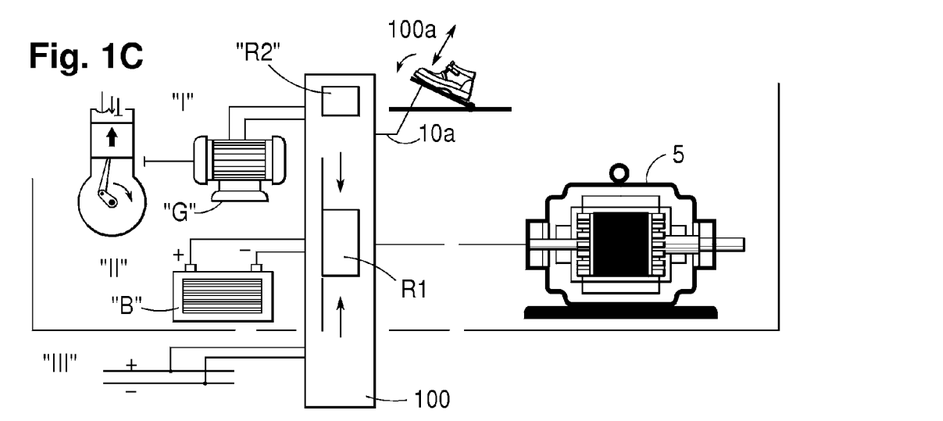

FIG. 1C clearly shows two vehicle-related sources of energy designated "I" and "II", a "first" one "I" in the form of a diesel generator "G", a "second" one "II" in the form of a battery or a battery set "B", and a "third" source of energy "III" in the form of a source of energy external to the vehicle and shaped here as parallel leads, conductors or rails which may be placed under or subject to an applied voltage, via coupling means or switches, and which are introduced into a track and a cavity in the road or roadway 2.

These are in FIG. 1C coordinated to a vehicle-related control circuit 100, which in response to power supplied to an electric drive motor 5 permits the selection of all or of any calculated combination of the power-supplying energy sources "I", "II", and "III", respectively. The power control is here illustrated as a throttle 100$a$, the movement of which up and down, respectively, is coupled to a maneuvering circuit "R2" within the control circuit 100, which in turn comprises a power distributing circuit "R1", that is adapted to distribute power and energy from and between the energy sources to the motor 5 and/or via any DC/AC-converter (not shown).

Figure 1D:
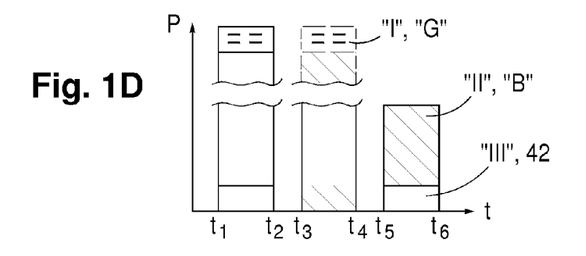
FIG. 1D illustrates a simplified "P/t" diagram (Power/time), with which full power or reduced power is to be transferred via the power-controlling circuit for propelling the vehicle along the road, its roadway and its road portions, FIG. 2 basically shows an electric arrangement related to a vehicle with control equipment for controlling a current collector or diverter for electric contact with paired conductors shaped as rails for enabling parallel operation of a vehicle-related electric motor from one or both of the two vehicle-related energy sources (first and second ones) and/or from the stationary source of energy (third) at the periphery of the vehicle.

FIG. 1D illustrates schematically in a "P/t" (Power/time) diagram how full power or reduced powers can be distributed and transferred for passage of the vehicle along different road portions 2$a$ of a road or roadway 2 with the help of the circuit "R1" and govered by the maneuvering circuit "R2".

Between moments or time slots $t_1$-$t_2$ it is illustrated basically how a complete withdrawal or use of power from the three power sources "I", "II", and "III", respectively, can be carried out, with the power withdrawal from power source "I" illustrated at the top, the power withdrawal from power source "II" illustrated thereunder (slanting lines) and the power withdrawal from power source "III" illustrated lowermost.

Between moments or time slots $t_3$-$t_4$ the same withdrawal of power from power source "I"; "G" is illustrator and a slightly increased withdrawal of power from power source "II" "B" is illustrated to cause the same total power consumption to the motor 5, whereas power source "III"; "42"; "s1" here is illustrated as being disconnected.

Between moments or time slots $t_5$-$t_6$, full withdrawal from power source "III"; "42" is illustrated together with a reduced withdrawal from power source "M";"B" is basically illustrated.

During this period of time $t_5$-$t_6$ full power can be withdrawn from power source "III"; "42" and a small surplus can be permitted for maintenance charging of the battery set "II", "B" depending of the power required by the motor 5.

The invention is based on that battery set "M";"B" and the second source of power "II" primarily are to feed motor 5 over the power distributing and/or dividing circuit "R1", and for this purpose battery set "B" is required to have stored energy, sufficient voltage and required current which can drive motor 5 at full power.

Battery set "II", "B" is in the first place to be charged for maintenance over power source "III"; "s1" and in the second place to be charged for maintenance over power source "I".

The power from power sources "I" and "III" can each be chosen to be 5-30% of the maximum power associated with the power source "II"; "B", such as around 25%:

The supply voltage to motor 5 can be chosen as +400 V DC and −400 V DC related to ground or "O"-potential, i.e. the total voltage value of 800 V DC.

The system "S" proposed by the invention is then primarily to include "a" one or more, each over an electric motor 5 or motors, electrically powerable vehicles 1, 1b, wherein the respective vehicles exhibit a power distributing and/or power regulating control circuit "R1" in control circuit 100 for creating a necessary power and/or speed control via a distributing circuit "R2" and the throttle 100a.

The required output power to motor 5 is primarily to be supplied by the power source "II"; "B" and secondarily is to remain under maintenance charging by power source "III"; "s1". Roadway 2 is shown to be divisible into road portions 2a (2a1, 2a2, 2a3; 2a1', 2a2', and 2a3'), wherein each one to advantage is to be allotted to an external source of power "III"; "s1", "s2" . . . "42", which here is illustrated as a plurality of electric stations, where the first one has been given the reference character "s1".

One or more of the third source of powers "III"; "s1" located outside of the vehicle and/or the first source of power "I"; "G" belonging to the vehicle can be utilized so as to thereby supplementarily charge the battery set "II"; "B" of the vehicle in an adapted time sequence of power removal from this battery set.

Within the framework of the invention there is also the possibility, in addition to driving the vehicle 1 over the battery set "II"; "B" and during a supplementary charging of the battery set "II"; "B" along the road portions and the stationary elongated electric stations "s1" or the power source "III", to cause a required additional power and energy for propelling the vehicle 1 over the road portion 2a1 by supplying energy over the source of power "I"; "G" belonging to the vehicle 1.

Figure 2:
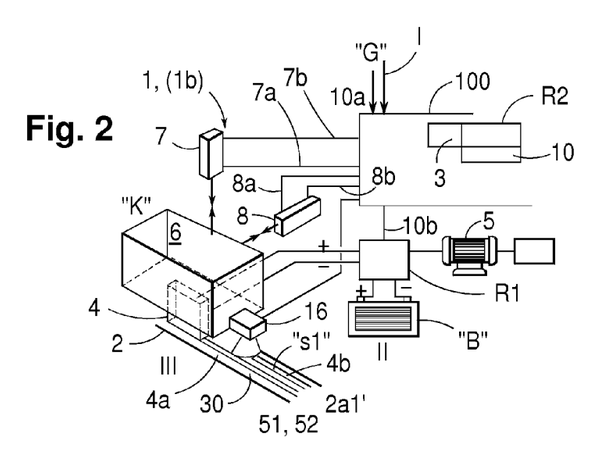

FIG. 2 basically shows an electrical/mechanical connecting arrangement "K" related to a vehicle 1, (1b) having a schematically illustrated control equipment 10 for controlling a contact means or current collector 4, belonging to the vehicle, towards and to an electric contact with conductors in at least pairs, in the form of rails 4a, 4b, for possible common parallel operation of the electric motor 5 from the battery set "II"; "B" and/or from the stationary station "III"; "s1" and/or from the diesel generator "I"; "G".

The contact means or current collector 4 is here related to a support 6, which can be moved upwards and downwards in height by means of a first electric auxiliary motor 7 and can be moved sideways back and forth by means of a second electric auxiliary motor 8.

The means and the control of the auxiliary motors 7, 8, respectively, which are required for this motion with the assistance of sensors, are not shown in detail but are basically known in the prior art and will be obvious to a person skilled in the art.

Both auxiliary motor 7 and auxiliary motor 8 can be actuated in a direction forward and backward, with a first motion being activated over a first signal on a first conductor 7a and a first signal on a first conductor 8a, respectively, whereas a second (opposite) motion is activated over a second signal on conductors 7a and 8a, respectively, with the instantaneous setting positions of the motors 7, 8 and said support 6 being evaluated by one or more sensors (not illustrated) and being indicated by means of a generated signal on second wires 7b and 8b, respectively.

These signals on the first conductors 7a, 8a are generated in a central unit or control circuit 100, having a control equipment 10, whereas signals on the second conductors 7b and 8b are generated in the same central unit 100, while utilizing position sensors (not shown).

Central unit 100 with the control equipment 10 is a complicated unit which i.a. over a sensor 16 is to be able to sense the presence of and the orientation of one or both conductors 4a, 4b and thereafter to lower the contact means or collectors 4 over auxiliary motor 7 to an electric contact with these two conductors 4a, 4b, which here are illustrated as being subjected to voltage power.

Over a connection 10a to the central unit 100 and its circuit "R2" the power, which over the power distributing circuit "R1" is to be supplied to motor 5, is controlled. For this purpose circuit "R1" has to be directly or indirectly controlled by a throttle or similar means 100a (FIG. 1C) so as to supply necessary power to motor 5 initiated by infeed signals over said maneuvering circuit "R2".

In the illustrated position, contact means or current collectors 4 lead current and voltage from energy source "IM";"s1" to said distributing circuit "R1" distributing power and energy. This circuit or another circuits "R2" sense, over central unit 100, the requirement of power for motor 5 and primarily supplies motor 5 with the power that it needs according to the input signal on the connection or wire 10a and generated output signal on the connection or wire 10b, whereby the stationary system "III"; "s1" is to be loaded and to supplement the power and energy requirements over battery set "II", "B".

Coupling the power source "III", "s1", taken out of the vehicle and its external source and the power source "I", "G" and/or the power source "II", "B" generated internally in the vehicle can here be carried out over the distributing circuit "R1" and the maneuvering circuit "R2".

Information about the desired speed and the power for the vehicle 1 associated therewith is supplied to central unit 100 over wire 10a, and circuit "R1" is actuated over internal circuit arrangements not shown, and causing a function for circuit "R2" and equipment "10" over conductor 10b.

Figure 3:
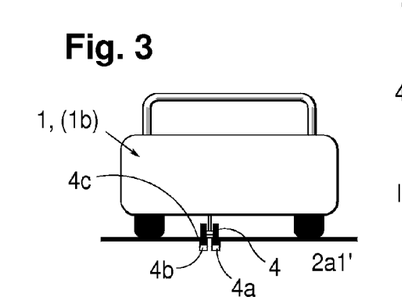
FIG. 3 shows a rear view of a vehicle with its downwardly directed two current collector, in the form of a sliding contacts or terminals in cooperation with individual ones of two voltage-carrying conductors or rails associated with the road portion and a third a terminal connected to ground potential.

FIG. 3 shows an end view of a vehicle 1 (1b) with its downwardly directed two contact means or current collectors 4 in mechanical and electrical cooperation with the two connectors or two live wires or rails 4a, 4b, allotted to the road portion 2a1' or the rails 4a, 4b and a neutral connector 4c to ground.

Figure 4:
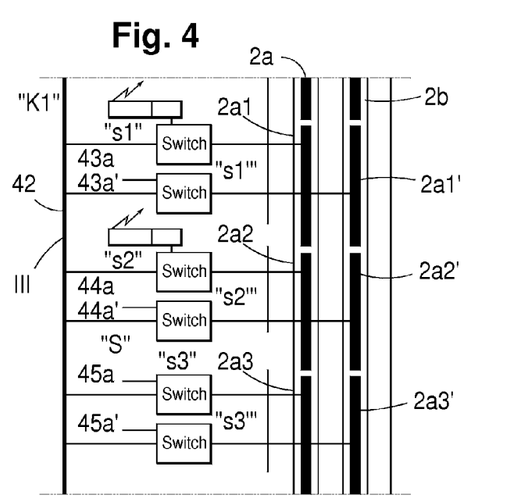
FIG. 4 shows an example of an electric arrangement wherein a plurality of road portions are provided with parallel conductive conductors, of which each one may be connected, over a switch, to its vehicle-remote electric station and wherein a road portion after a road portion may be activated and may be provided with voltage by activating its switching means or its switch over a control unit while a vehicle passes road portion after road portion.

FIG. 4 shows an electric connecting arrangement "K1", in which road portion after road portion 2a1, 2a2 and 2a3 as well as 2a1', 2a2' and 2a3', respectively, with their station after station "s1", "s2", "s3" and "s1'\"s2'" and "s3'" can be activated separately and/or are made to receive voltage from one and the same superior charging source "III", 42 over switches or coupling means 43a, 44a and 45a for one roadway 2a as well as 43a', 44a' and 45a' for the oppositely directed roadway 2b, depending on when a vehicle 1 will pass along the road portions 2a, 2b.

For this a number of switches or coupling means for connecting stations "s1", "s2" . . . , are required, wherein this connecting and disconnecting can occur over stationary sensors (not shown) related to each of the illustrated road portion.

"A" of FIG. 5 shows a cross-section of a first embodiment of a canalization 30 for at least two voltage-carrying conductors or rails 4a (4a) 4b oriented with regard to opposing or averted side surfaces 51' and 52', respectively, of an open cavity 51, 52 as a slit or groove at right angles upwards or alternatively with regard to a bottom surface 53' of the cavity. The respective conductors or rails 4a, 4b, and ground conductor 4c can be disposed as shown.

"B" of FIG. 5 shows a cross-section of a second embodiment in which two voltage-carrying conductors or rails 4a, 4b are placed in a canalization 30 provided with closable cavities 51, 52, wherein the closures are illustrated as over individual rotational shafts rotatable covers 51a and 52a in closed position and in open position with dashed lines.

A third embodiment is shown in cross section under "C" having a central groove 54 so as to be able to perform a cleaning and/or cleansing process with the assistance of means adapted for this. The grooves 51, 52 with its openings 55, 56 are shaped so as to make the conductors or rails 4a, 4b accessible to individual current collectors 4 (not shown).

A drain opening 57 is positioned in the lowermost portion of embodiment "C" together with a heating cable 57a placed therein.

D1' and "D2" show in cross-section a fourth embodiment having two current collectors 4, 4', which may be angled to a right angle, when introduced into a canalization 30. "D1" shows introducing the current collectors 4, 4' through a centrally located opening 58, whereas "D2" shows that current collectors 4, 4' are angled, each over an individual axis of rotation, to a mechanical and electrical contact with its current-carrying rail 4a, 4b.

Under "E1" and "E2" a fifth embodiment is shown in cross-section having arc-shaped current collectors 4, 4', which may be rotated around individual center axes C, C.

FIG. "E1" has the purpose of illustrating a non-introduced position of the current collectors 4, 4', whereas FIG. "E2" has the purpose of illustrating an introduced and with the current-conducting rails 4a, 4b electrically and mechanically cooperating position.

Under "F" a sixth embodiment is shown in a lateral view, having two upwardly, over spring means 59a, 59b loaded covers 59a' and 59b' for protecting the parallel contact rails 4a, 4b positioned below.

Under "G1" and "G2" in a side view and in two projections a seventh embodiment having wheel-shaped current collectors 4, 4' is shown. FIG. "G1" shows the current collectors 4, 4' in a front view, whereas FIG. "G2" shows only one current collector 4 in a lateral view. The current collectors are rotatable around a common center "ca" of rotation.

Finally, under "H1" and "H2" wheel-shaped current collectors 4, 4' are shown as an eighth embodiment in a side view and in a side projection.

FIG. "H1" shows wheel-shaped current collectors 4, 4' in a side view whereas FIG. "H2" shows the two current collectors 4, 4<'> in a front view, with current collectors 4, 4' positioned parallel and being circular with regard to each other, rotatably disposed around an axis of rotation "Ca".

More particularly, FIG. "H2" illustrates the orientation of the two side-related current collectors 4, 4'.

Figure 6:
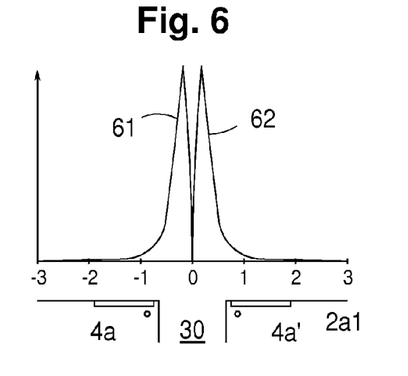
FIG. 6 illustrates sensitivity curves valid for two magnetic sensor units in association with a track surrounded by current-carrying conductors.

In two graphs 61, 62 in FIG. 6 illustrates the sensitivity graphs of a sensor of a magnetic sensor unit, when it passes from one rail 4a to a second rail 4a' in a canalization 30, which extends long a plurality of road portions, such as road portion 2a1.

Figure 7:
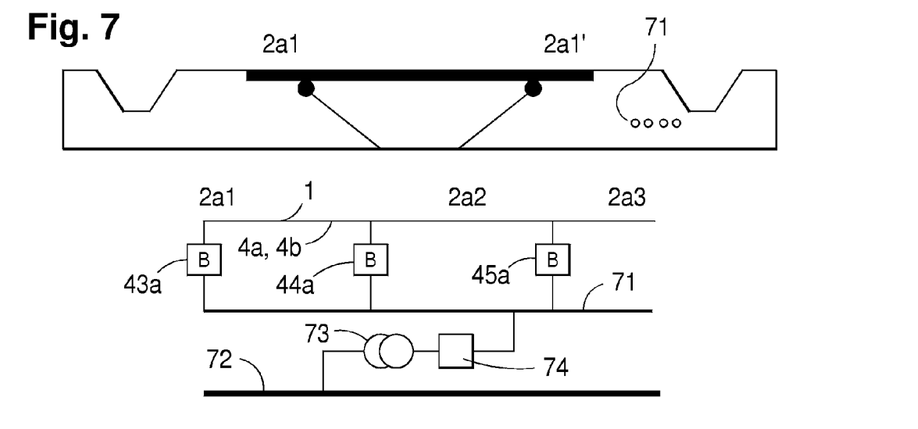
FIG. 7 illustrates partly a road portion in a sectional view with a side-related cables on the right and further an example of how solely short road sections or portions would be capable of being activated with an AC or DC supply voltage, when a vehicle passes thereover.

FIG. 7 illustrates in a sectional view a road portion 2a1 coordinated with an adjacently oriented parallel road portion 2a1' and further an example of the manner in which solely short road portions 2a1, 2a2, and 2a3, respectively, will be successively activated as a vehicle 1 passes the portions and in utilizing a DC low voltage cable 71 for three road portions 2a1, 2a2 and 2a3 and an AC high voltage cable 72 with associated transformer 73 and rectifier bridge 74. Each road portion with its two DC-voltage carrying conductors 4a, 4b, cooperates with its switch or connecting means 43a, 44a and 45a, respectively.

The voltage cable 72, the transformer 73 and the rectifier bridge 74 ars allotted a superior arrangement.

Figure 8:
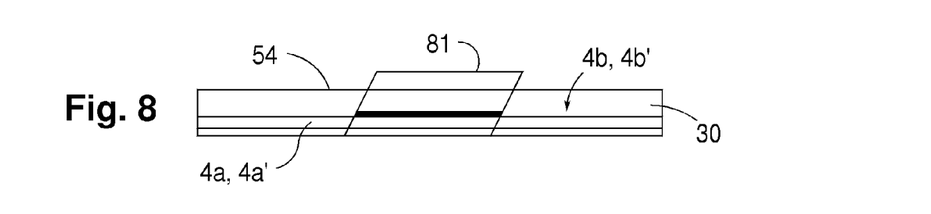
FIG. 8 shows a side view of an embodiment with means for purging and cleaning a track or a slit with current carrying conductors from small particles, as snow, ice, water, sand, and other particles.

FIG. 8 shows in a lateral view an arrangement 81 having means for cleaning one or more conductors 4a, 4b set under voltage and carrying current or conductors 4a', 4b', which are not set under voltage in a canalization 30, from ice, snow, water, sand, and other small particles, so as to thereby be able to release and clean each of the conductors 4a, 4a'; 4b, 4b' from particles.

Figure 5A:
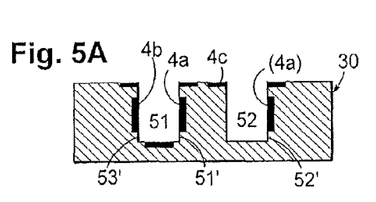
Figure 5B:
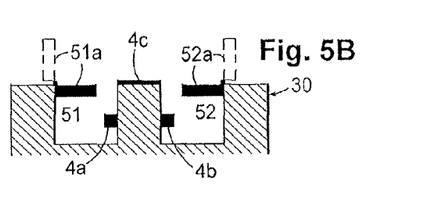
Figure 5C:
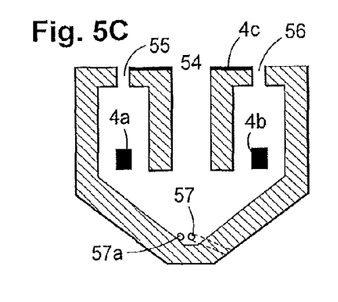
Figures 5D, 5D:
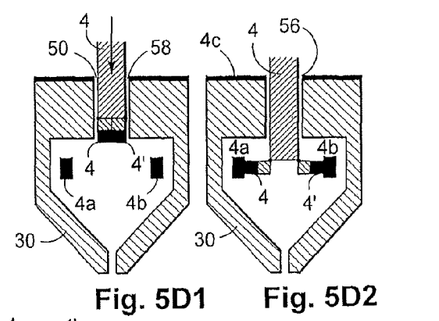
Figures 5E, 5F, 5G, 5H, 5H:
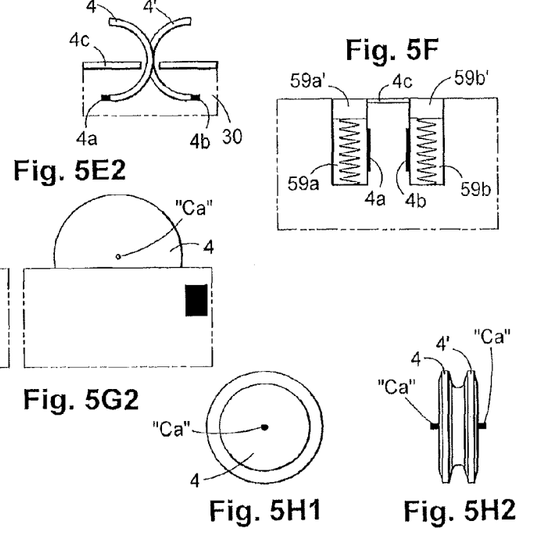
Figures 5E, 5G:
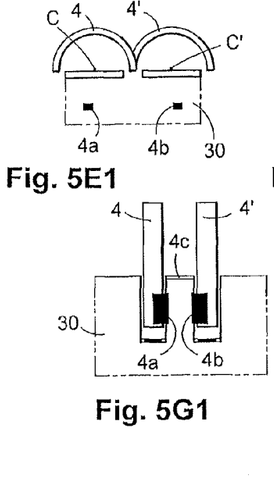

Arrangement 81 is adapted to be able to be displaced along the slit 54 in FIG. 5C by its means.

Figure 9:
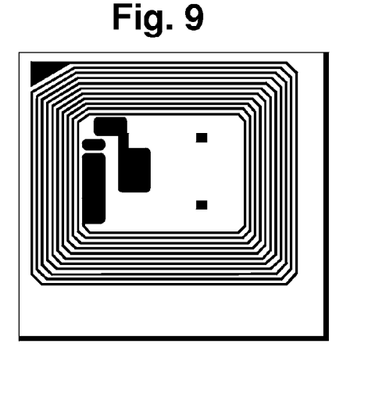
FIG. 9 illustrates a plan view of a sensor for detecting from a vehicle that the vehicle is leaving a road portion and is passing over to a new road portion by means of RDIF-technology (Radio Frequency IDentification)

FIG. 9 illustrates an example of a sensor, which is adapted to indicate that the vehicle leaves one road portion 2a1 and passes over to a new road portion 2a2 in order to be able to detect the transit by means of RDIF-technology (Radio Frequency IDentification). The sensor 16 may to advantage be vehicle-related.

Figure 10:
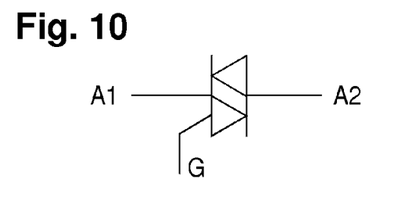
Figure 11:
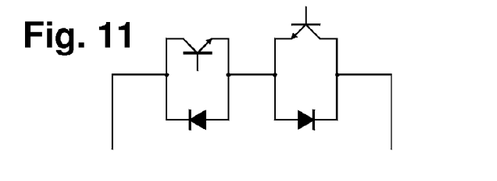
FIG. 11 illustrates an "IGBT"-switch which is appropriate for the invention and which can be chosen for connecting and disconnecting AC supply voltages in both directions.

FIG. 10 illustrates a known "Triac"-switch, whereas FIG. 11 illustrates a known "IGBT" switch, which may be used in FIG. 4 as a part of switches 43a, 44a, etc.

Figure 12:
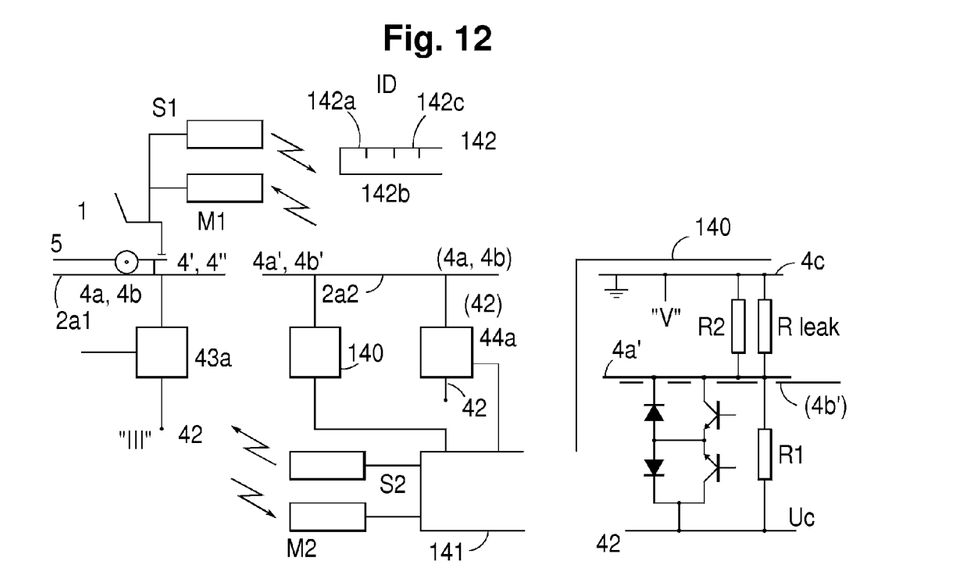
FIG. 12 illustrates an embodiment of the invention with first vehicle-related transmitter/receiver circuits for a wireless information transfer to other transmitter/receiver circuits related to a preceding or succeeding road portion and a wiring diagram with an "IGBT"-switch serving within and as a surveillance or testing circuit.

The present invention takes as its basis the above shown and described embodiment and intends to concentrate on the electric connection of individual road portions with its two conductors 4a, 4b over allotted switches 43a, 44a in accordance with FIG. 12.

Thus, FIG. 12 illustrates coordination between the two conductors 4a, 4b under voltage of road portion 2a1 and the contact means 4, 4<'> of vehicle 1 as occurs over two coordinated current collectors, such as contact springs 4', 4" adapted for electric cooperation with the respective ones of the two conductors 4a, 4b, which may be placed under voltage, and that a road portion 2a1 supporting the vehicle 1, over its conductors 4a, 4b and its external electric source of energy "III", "42" can feed the battery set "II", "B" and the engine 5 of the vehicle from its associated switch 43a.

The road portion 2a2, in front of portion 2a1, with its two electric conductors 4a', 4b', is to be tested and controlled successively with regard to if that road portion 2a2 is to be considered as in intact condition or not and if that road portion 2a2 is to be found intact not until thereafter is that portion 2a2 provided with its DC or AC supply voltage from the external electric source of energy "III"; "42" and from its associated switch 44a however solely during the time interval or time slot that vehicle 1 will pass this road portion 2a2.

It is illustrated here that a switch or a connecting means 43a, 44a is to be related to each or to solely selected road portions 2a1, 2a2 and its two electric conductors 4a, 4b; 4a', 4b', wherein a coupling means 44a not yet activated is to be related to a succeeding road portion 2a2 with its conductors 4a', 4b', and wherein this switching means 44a is to be adapted to be initiated by a testing or surveillance circuit 140 by means of a go-ahead signal after it being sensed and tested that the road portion 2a2 is in intact condition before the coupling means 44a is activated to supply its DC or AC supply voltage (42) to its conductors (4a, 4b).

The testing or surveillance circuit 140 is adapted by means of a remote-controlled signal (radio signal) from a transmitter S1 in the vehicle 1 on the one hand to carry out a checkup testing circuit 140 that the road portion 2a2 and its conductors 4a', 4b' are in intact condition and on the other hand to register an identity D1 allotted to vehicle 1 and/or its driver or owner and furthermore to activate coupling means 44a for supplying feed voltage to its conductors.

Contact means 4 are paitwise allotted to the front portion of vehicle 1.

More particularly, FIG. 12 illustrates that the vehicle 1 is provided with a transmitter S1 and a receiver M1 for cooperation with a stationary receiver M2 and transmitter S2 related to the central unit 100.

Transmitting and receiving can occur in the form of data packages 142 with an introductory package 142a activating the testing circuit 140, a following package 142b transferring the identity "ID" of the vehicle 1 and/or its driver, an additional package 142c representing a requirement of or arequesting of any measuring power for road portion 2a2, etc.

The testing circuit 140 can be structured as the switching diagram illustrated in FIGS. 10 and 11.

This circuit 140 is adapted such, that before conductors 4a', 4b' are subjected to voltage the impedance to ground potential 4c is measured. If the impedance is too low, conductor 4a' is not subjected to voltage (conductor 4b' is tested in a corresponding circuit) as this can indicate that the track with the conductors is filled with water or that some object causes a short circuit (sabotage or something that may have loosened from another vehicle).

In consequence of introducing two resistors R1 and R2 in circuit 140, one for each conductor 4a', (4b<1>), which can be of equal size conductors 4a', (4b'), which are to be subjected to voltage, will expose a voltage which is determined by resistors R1 and R2. If they are equal, the voltage will be half of the voltage of a low voltage cable $U_c$, which receives its voltage from conductor 42.

If something happens to be wrong with semiconductor breaker 44a so that it always is connecting, an applied voltage will instead be the same as low voltage U0. This provides a protective engagement, and a breaker disconnects the voltage on the low power cable so that the entire road portion 2a2 looses its voltage via its switch 44a in an inactivated state.

If the leakage current is substantial, resistor $R_{leak}$, will exhibit a low value.

In order to place a road portion 2a2 under voltage solely when a vehicle 1 passes, a distance identifying system, for example RFID (Radio Frequency Identification), can be used.

This system will then be able to transmit the identification "ID" of the vehicle 1 which discloses that it is a vehicle 1 belonging to the system or an automobile and also the speed of the automobile.

If the vehicle moves very slowly or stands still there is a danger that some person can be on the road portion 2a2 and in such case it can be appropriate not to place section 2a2 under voltage.

If vehicle 1 or any other means indicates that the speed is for example 72 kilometers per hour, i.e. 20 meters per second, and the length of the road portion is 40 meters, it can be permitted to be under voltage for two seconds, i.e. the time that it takes for the vehicle to pass the road portion 2a1 or 2a2. The danger of a person coming into contact with a conductor or rail 4a, 4b, under voltage, and the ground conductor 4c is hereby minimized.

Figure 13:
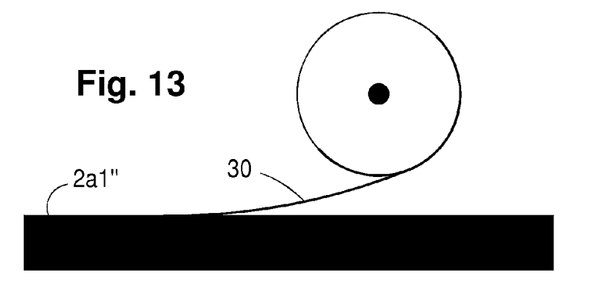
FIG. 13 illustrates a lateral view of the principle of positioning a canalization to a road portion and with the elongate canalization being shaped as a cable.
Figure 14:
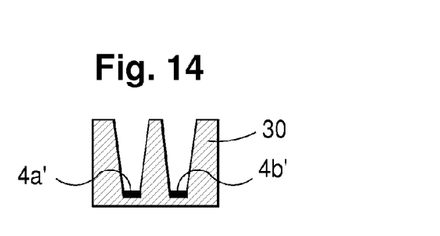
FIG. 14 illustrates a cross-section of a canalization of a ninth embodiment having two conductors for being placed under voltage and being oriented to the lower portions of the canalization.

FIG. 13 illustrates a lateral view of the positioning of a canalization 30 shaped as a cable which may be bent along a section 2a1" and may have a cross-section as shown in FIG. 14. Two bendable conductors 4a', 4b', that each may carry current are disposed here.

Figure 15:
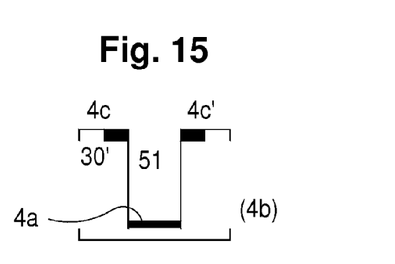
FIG. 15 illustrates a cross-section of a canalization of a tenth embodiment.

FIG. 15 shows a canalization 30<'> in a cross-section having a sole conductor 4a at the bottom of a track 51 and with individually grounded wires 4c, 4c' being disposed at the upper edges of the track.

Two such canalizations 30' can be disposed close to each other so as to offer two parallel conductors 4a, (4b).

It should be particularly noted that each road portion with its two conductors is to be able to have one and the same supply voltage or polarity by switches allotted to the road portion.

The road portions can be chosen to be of arbitrary length and are selected entirely independently of the lengths of the vehicles.

The invention is naturally not limited to the embodiment disclosed above as an example and it can be subjected to modifications within the framework of the inventive concept as illustrated in the following claims.

It should be particularly noted that each illustrated unit and/or circuit can be combined with all other illustrated units and/or circuits within the framework of being able to achieve the desired technical function.

The invention claimed is:

1. A system adapted for driving or propelling a vehicle powered by one or more batteries or a battery set along a roadway, comprising a plurality of road sections or portions, comprising:

a plurality of roadway sections for subdividing the roadway into said roadway sections, wherein said roadway and each one of these road sections or portions comprise one or more elongated canalization, said canalization comprising a groove having at least two electric conductors introduced along said canalization and its groove and being connectable over a switch to one or more vehicle-external electrical power sources, including a vehicle-external electric station, so as thereby to be able to charge said battery set belonging to said vehicle, but primarily driving the vehicle along the roadway and its roadway sections; and one or more driveable or propellable vehicles which may be driven by means of an individual electric motor or motors, with the respective vehicle exhibiting a control circuit controlling necessary power and adapted for creating necessary power control and/or speed control, said vehicle being provided on its underneath side with contact means comprising current collectors which are displaceable up and down and sideways in relation to the conveyance direction of the vehicle, wherein said elongated groove extends along the roadway and the roadway sections and wherein said contact means is coordinated with vehicle-related control equipment for creating adaptation of the contact means for at least offering a mechanical and electrical contact against said track related conductors, wherein coordination between a conductor under voltage, belonging to a roadway section, and the contact means of the vehicle, occurs over coordinated current collectors adapted for mechanical and electrical cooperation with respective ones of the voltage-powered conductors, whereby each roadway section, that supports the vehicle, is, with the at least two electric conductors, subject to a chosen voltage and current from the vehicle external electric power source, said two conductors being adapted to feed, over the contact means, the two adjacently oriented contacts related to said vehicle, the battery set and/or the motor of the vehicle, via a vehicle external switch allotted to said roadway section, whereas an adjacently positioned and a succeeding roadway section, with the at least two electric conductors, is via the vehicle external switch not subject to any voltage or current, and during time sequences or time slots when said succeeding roadway section is not subject to exposed voltage or current, said succeeding roadway section is adapted to be tested and controlled with regard to its intact condition, and, if found in intact condition, is adapted to be provided with a DC or AC supply voltage from the vehicle external electric power source or another external or internal source of power, from the switch allotted to said succeeding roadway section solely during a time sequence or time slot when said vehicle passes said succeeding roadway section, wherein each roadway section, comprising the groove is formed for supporting at least two conductors and is adapted to receive the same two-phase supply voltage via the related switch, wherein at least one electric power supplying conductor is adapted to extend along a groove formed in an electrically insulated canalization and comprising side and bottom surfaces at right angles to each other, said conductor being attached to the inner surface or bottom wall section of said groove, wherein an upper open part of said groove in said canalization is positioned in a plane coordinated with an upper plane of the roadway and the roadway sections, wherein said electric power supplying conductor is attached to a horizontal bottom section of said groove and a further conductor is attached to the upper opening of the groove and connected to ground potential and wherein said opening is adapted to receive said vehicle related contact means and a means for cleansing or cleaning the groove and the horizontally oriented conductor from particles, and wherein the system further comprises a testing and/or supervising circuit adapted firstly to check, by using a remote-controlled radio signal from the vehicle, whether a forwardly lying roadway section with its conductors is in its intact condition, secondly to register an identity allotted to the vehicle and/or its driver and thirdly to activate a coupling means for providing a supply voltage to its conductor.

2. A system in accordance with claim 1, wherein said insulated canalization includes two grooves formed with their inner surfaces at right angles and each comprising an upper opening.

3. A system in accordance with claim 1, wherein a first electrically insulated groove comprising parallel side sections is oriented parallel to a second electrically insulated groove, each having an electric power supplying conductor attached to a groove related side surface.

4. A system in accordance with claim 1, wherein the groove in said canalization comprises at least two conductors distributed on opposing or averted side surfaces of the upwardly opened groove, said opening being formed as a slit along the roadway or the roadway sections, and/or a conductor at the horizontal bottom section of said open groove.

5. A system in accordance with claim 1, wherein said canalization and its groove allotted to a track are adapted to support an electrically conductive cable adapted for heat dissipation or radiation and having an adapted resistor facility related thereto.

6. A system in accordance with claim 1, wherein said contact means comprises a cleaning and/or cleansing means adapted to the corresponding groove in said canalization.

* * * * *